United States Patent
Naito

(10) Patent No.: US 8,307,446 B2
(45) Date of Patent: Nov. 6, 2012

(54) DATA USING APPARATUS

(75) Inventor: Joji Naito, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 2442 days.

(21) Appl. No.: 11/118,325

(22) Filed: May 2, 2005

(65) Prior Publication Data

US 2006/0095973 A1     May 4, 2006

(30) Foreign Application Priority Data

Oct. 19, 2004    (JP) ................................. 2004-304238

(51) Int. Cl.
*G06F 21/00*     (2006.01)
(52) U.S. Cl. ......................................... 726/26; 713/187
(58) Field of Classification Search .................. 713/187; 726/26–33; 380/200–242

See application file for complete search history.

(56) References Cited

U.S. PATENT DOCUMENTS

| 6,477,530 | B1 * | 11/2002 | Omata et al. ...................... 707/9 |
| 7,266,202 | B1 * | 9/2007 | Kawakami et al. ........... 380/283 |
| 7,266,691 | B1 * | 9/2007 | Ishiguro et al. ............... 713/168 |

FOREIGN PATENT DOCUMENTS

| JP | 2001-147970 | 5/2001 |
| JP | 2002-132457 | 5/2002 |

* cited by examiner

*Primary Examiner* — Hadi Armouche
(74) *Attorney, Agent, or Firm* — Louis Woo

(57) ABSTRACT

In a data using apparatus, first data use history information is generated in accordance with every use of data. The first data use history information represents a starting time and an ending time of every use of data. The first data use history information is sent toward an external apparatus. Second data use history information is received from the external apparatus. Calculation is made as to first data use terms between the starting times and the ending times represented by the first data use history information. Calculation is made as to second data use terms between starting times and ending times represented by the second data use history information. Multiple apparatus use notice information is generated when at least one of the calculated first data use terms and at least one of the calculated second data use terms overlap each other.

15 Claims, 10 Drawing Sheets

FIG. 5

| | c1 | c2 | c3 | c4 | c5 |
|---|---|---|---|---|---|
| DATA USING ACTION 1 | STARTING TIME 1 | ENDING TIME 1 | DATA ID INFO 1 | DATA USING APPARATUS ID INFO 1 | NUMBER 1 OF DATA USING APPARATUSES PERMITTED TO BE EMPLOYED |
| DATA USING ACTION 2 | STARTING TIME 2 | ENDING TIME 2 | DATA ID INFO 2 | DATA USING APPARATUS ID INFO 2 | NUMBER 2 OF DATA USING APPARATUSES PERMITTED TO BE EMPLOYED |
| DATA USING ACTION 3 | STARTING TIME 3 | ENDING TIME 3 | DATA ID INFO 3 | DATA USING APPARATUS ID INFO 3 | NUMBER 3 OF DATA USING APPARATUSES PERMITTED TO BE EMPLOYED |
| ...... | ...... | ...... | ...... | ...... | ...... |
| DATA USING ACTION N | STARTING TIME N | ENDING TIME N | DATA ID INFO N | DATA USING APPARATUS ID INFO N | NUMBER N OF DATA USING APPARATUSES PERMITTED TO BE EMPLOYED | ct

DATA USE HISTORY INFORMATION

| | DATA USING APPARATUS ID INFO | NUMBER OF DATA USING APPARATUSES PERMITTED TO BE EMPLOYED | STARTING TIME | ENDING TIME |
|---|---|---|---|---|
| DATA USING ACTION 1 | APPARATUS 1 | 3 | t1 | t2 |
| DATA USING ACTION 2 | APPARATUS 2 | 1 | t3 | t4 |
| DATA USING ACTION 3 | APPARATUS 3 | 1 | t5 | t6 |

DATA USING APPARATUS

BACKGROUND OF THE INVENTION

1. Field of the Invention

This invention generally relates to an apparatus for using data such as reproducing or copying the data. This invention particularly relates to a data using apparatus capable of limiting the use of data, for example, forbidding the reproduction or the copying thereof.

2. Description of the Related Art

Data recorded on a package medium such as a CD or a DVD is used in various ways including the following ones. Data is copied from a package medium onto a recording medium within a hard disc drive (HDD) in a personal computer. Data is copied from a package medium onto a recording medium in a recording and reproducing apparatus via a personal computer. Data is directly copied from a package medium onto a recording medium in a recording and reproducing apparatus.

Data can be copied onto or downloaded to a recording medium within a hard disc drive (HDD) in a personal computer through a communication network such as the Internet.

In some cases, the copying of data is for personal use. The transmission of data among machines of many unspecified persons involves the copying of the data beyond personal use. It is difficult to discriminate between the copying of data for personal use and the copying of data beyond personal use. This difficulty sometimes causes a problem associated with the protection of a copyright on the contents of data.

There is an information delivery service for supplying encrypted data which can be used only by specified reproducing apparatuses. Since only specified reproducing apparatuses can use the encrypted data, the information delivery service tends to be inconvenient for a user having a plurality of reproducing apparatuses.

It is known to count the number of times of the copying of data, and forbid the copying of the data when the counted number reaches a prescribed number. It is also known to forbid making a second-generation copy of data. These copy protection technologies are not always in harmony with the range of personal use.

There is a copy protection system designed so that data is erased from a recording apparatus after the data is copied therefrom onto a reproducing apparatus. The copy protection system tends to be inconvenient for a user having a plurality of reproducing apparatuses.

Japanese patent application publication number P2004-110816A discloses a contents copy management system including a contents reproducing apparatus and a contents copy management apparatus. The contents reproducing apparatus sends a management request to the contents copy management apparatus. In response to the management request, the contents copy management apparatus returns either an allowance or a rejection to the contents reproducing apparatus. The allowance enables the contents reproducing apparatus to copy contents. The rejection inhibits the contents reproducing apparatus from copying the contents. The contents copy management apparatus stores a copy permission residual number deciding which of an allowance and a rejection should be returned. The copy permission residual number is decremented each time an allowance is returned.

The contents copy management by the system of Japanese application P2004-110816A can not be applied to a contents reproducing apparatus incapable of communicating with the contents copy management apparatus.

Japanese patent application publication number P2004-120736A discloses a group formation management system including a group management device and member devices registered in a related group. Each of the registered member devices holds common secret information peculiar to the group. The group management device also holds the common secret information. A new device sends a registration request to the group management device. In response to the registration request, the group management device operates as follows. When the number of the registered member devices is less than a limit number, the group management device registers the new device in the group as a new member. Then, the group management device outputs the common secret information to the new registered member device. The new registered member device stores the common secret information. On the other hand, when the number of the registered member devices is not less than the limit number, the group management device does not register the new device in the group. The group management device stores contents. In the case where a member device requests the contents, the group management device authenticates the member device by comparing the common secret information in the group management device and the common secret information in the member device. When the result of the authentication is positive, the group management device outputs the contents to the member device. On the other hand, when the authentication result is negative, the group management device does not output the contents.

The limit number of the registered member devices in the group in the system of Japanese application P2004-120736A is not always in harmony with the range of personal use.

SUMMARY OF THE INVENTION

It is a first object of this invention to provide a convenient apparatus for using data while reliably protecting a copyright on the contents of the data.

A first aspect of this invention provides a data using apparatus comprising a data recording device for recording data; a data using device for using data recorded by the data recording device; first means for generating first data use history information in accordance with every use of data by the data using device, the first data use history information representing a starting time and an ending time of every use of data by the data using device; second means for sending the first data use history information generated by the first means toward an external apparatus; third means for receiving second data use history information from the external apparatus; fourth means for calculating first data use terms between the starting times and the ending times represented by the first data use history information; fifth means for calculating second data use terms between starting times and ending times represented by the second data use history information received by the third means; sixth means for deciding whether or not at least one of the first data use terms calculated by the fourth means and at least one of the second data use terms calculated by the fifth means overlap each other; and seventh means for generating multiple apparatus use notice information when the sixth means decides that at least one of the first data use terms and at least one of the second data use terms overlap each other.

A second aspect of this invention provides a data using apparatus comprising a data recording device for recording data; a data using device for using data recorded by the data recording device; first means for generating first data use history information in accordance with every use of data by the data using device, the first data use history information representing a starting time and an ending time of every use of data by the data using device; second means for sending the first data use history information generated by the first means toward an external apparatus; third means for receiving second data use history information from the external apparatus; fourth means for combining the first data use history information and the second data use history information received by the third means into third data use history information; fifth means for calculating data use terms between starting times and ending times represented by the third data use history information generated by the fourth means; sixth means for deciding whether or not at least two of the data use terms calculated by the fifth means overlap each other; and seventh means for generating multiple apparatus use notice information when the sixth means decides that at least two of the data use terms overlap each other.

A third aspect of this invention provides a data using apparatus comprising a data recording device for recording data; a data using device for using data recorded by the data recording device; first means for generating first data use history information in accordance with every use of data by the data using device, the first data use history information representing a starting time and an ending time of every use of data by the data using device and data identification information about data undergoing every use; second means for sending the first data use history information generated by the first means toward an external apparatus; third means for receiving second data use history information from the external apparatus; fourth means for combining the first data use history information and the second data use history information received by the third means into third data use history information; fifth means for calculating data use terms between starting times and ending times represented by the third data use history information generated by the fourth means; sixth means for deciding whether or not at least two of the data use terms calculated by the fifth means overlap each other; seventh means for deciding whether or not overlapping data use terms correspond to same data identification information when the sixth means decides that at least two of the data use terms overlap each other; and eighth means for generating multiple data use notice information when the sixth means decides that at least two of the data use terms overlap each other, and when the seventh means decides that overlapping data use terms correspond to same data identification information.

A fourth aspect of this invention provides a data using apparatus comprising a data recording device for recording data; a data using device for using data recorded by the data recording device; first means for generating first data use history information in accordance with every use of data by the data using device, the first data use history information representing a starting time and an ending time of every use of data by the data using device, data identification information about data undergoing every use, and apparatus identification information about the present apparatus and related to every use of data; second means for sending the first data use history information generated by the first means toward an external apparatus; third means for receiving second data use history information from the external apparatus; fourth means for combining the first data use history information and the second data use history information received by the third means into third data use history information; fifth means for calculating data use terms between starting times and ending times represented by the third data use history information generated by the fourth means; sixth means for deciding whether or not at least two of the data use terms calculated by the fifth means overlap each other; seventh means for deciding whether or not overlapping data use terms correspond to same data identification information when the sixth means decides that at least two of the data use terms overlap each other; eighth means for deciding whether or not overlapping data use terms correspond to same apparatus identification information denoting the present apparatus; and ninth means for generating multiple data use notice information when the sixth means decides that at least two of the data use terms overlap each other, when the seventh means decides that overlapping data use terms correspond to same data identification information, and when the eighth means decides that overlapping data use terms correspond to same apparatus identification information denoting the present apparatus.

A fifth aspect of this invention is based on the first aspect thereof, and provides a data using apparatus further comprising eighth means for disabling attribute information related to the first data use history information and the second data use history information in response to the multiple apparatus use notice information generated by the seventh means.

A sixth aspect of this invention is based on the first aspect thereof, and provides a data using apparatus further comprising an information recording device for recording first attribute information peculiar to the present apparatus; eighth means for receiving second attribute information from the external apparatus; ninth means for deciding whether or not the first attribute information recorded by the information recording device and the second attribute information received by the eighth means are identical with each other; tenth means for transmitting the second data use history information from the third means to the fifth means when the ninth means decides that the first attribute information and the second attribute information are identical with each other; and eleventh means for inhibiting transmission of the second data use history information from the third means to the fifth means when the ninth means decides that the first attribute information and the second attribute information are not identical with each other.

A seventh aspect of this invention is based on the third aspect thereof, and provides a data using apparatus further comprising ninth means for disabling attribute information related to data corresponding to the overlapping data use terms and the same data identification information in response to the multiple data use notice information generated by the eighth means.

An eighth aspect of this invention is based on the first aspect thereof, and provides a data using apparatus wherein data recorded by the data recording device has added information representing a number of data using apparatuses permitted to be employed, and the seventh means comprises means for calculating a number of overlapping data use terms among the first data use terms and the second data use terms, means for deciding whether or not the calculated number is greater than a number of data using apparatuses permitted to be employed which is represented by added information related to data corresponding to the overlapping data use terms, and means for generating multiple apparatus use notice information when it is decided that the calculated number is greater than the number of data using apparatuses permitted to be employed.

This invention has advantages as follows. It is possible to limit the simultaneous use of data by a plurality of data using apparatuses having the same attributes. In the case where a license to copy data is granted to a person, it is possible to permit the copying of the data between data using apparatuses having the same attributes and owned by the licensed person.

It is unnecessary to transfer the data each time a data using apparatus employed by the licensed person is changed from one to another. It is possible to implement high copyright protection.

A decision can be made as to whether or not data is simultaneously used by a plurality of data using apparatuses on a data-by-data basis. Only for data used in multiple, the use thereof can be limited. Therefore, selective management can easily be made as to a limitation on data use. In the case where a data using apparatus is employed by a person different from its owner, the attribute information piece concerning the apparatus can be prevented from being erroneously disabled. Furthermore, the use of the attribute information piece concerning the apparatus can be prevented from being partially limited.

When two of data using apparatuses having the same attributes are connected, data use history information is copied between them. By sequentially making such connections, it is possible that each of the data using apparatuses finally has the same data use history information whose components are equal to the original data use history information in the apparatuses. In this case, it is possible to detect the simultaneous use of data by ones of the data using apparatuses which are not currently connected.

Information representing a predetermined number of data using apparatuses permitted to be employed can be added to data. In this case, the management of multiple data use can be performed to limit the number of data using apparatuses which use the data.

BRIEF DESCRIPTION OF THE DRAWINGS

FIG. 5 is a diagram of the structure of data use history information in the third embodiment of this invention.

DETAILED DESCRIPTION OF THE INVENTION

First Embodiment

According to a first embodiment of this invention, attribute information pieces are assigned to data using apparatuses, respectively. The attribute information pieces are peculiar to the related data using apparatuses, respectively.

Each attribute information piece is arbitrarily decided by a user of a related data using apparatus. Each attribute information piece represents, for example, the name of a user of a related data using apparatus or the nickname of the related data using apparatus. Each attribute information piece may be a unique information piece decided in conformity with given prescriptions.

In the case where toll contents are sold to a person, an information piece for identifying the person is used as an attribute information piece which should be assigned to a data using apparatus permitted to use the toll contents. In this case, the person is allowed to copy the toll contents by referring to the attribute information piece and employing the data using apparatus. On the other hand, the copying of the toll contents onto other data using apparatuses is limited.

Figure 1:
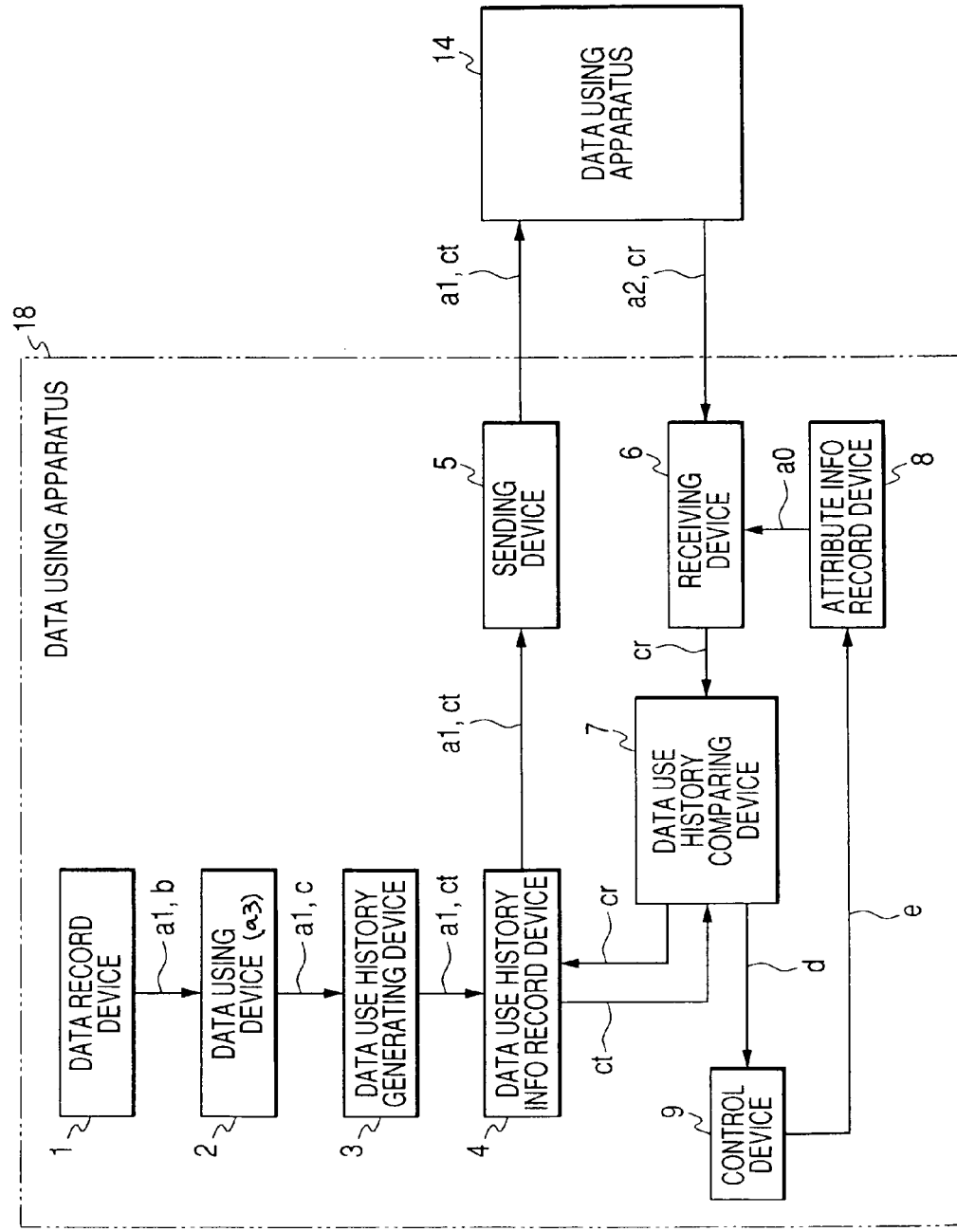
FIG. 1 is a block diagram of a data using apparatus according to a first embodiment of this invention.

FIG. 1 shows a data using apparatus 18 according to the first embodiment of this invention. With reference to FIG. 1, the data using apparatus 18 includes an attribute information recording device 8 which holds an information piece a0 representing the attributes of the apparatus 18. The information piece a0 is referred to as the attribute information piece a0. The attribute information piece a0 is assigned to the data using apparatus 18. The attribute information piece a0 is peculiar to the data using apparatus 18. The attribute information recording device 8 contains, for example, a memory.

The data using apparatus 18 includes a data recording device 1 which holds an attribute information piece a1. The data recording device 1 is assigned the attribute information piece a1. Provided that the data recording device 1 is legitimate with respect to the data using apparatus 18, the attribute information piece a1 is identical with the attribute information piece a0. The data recording device 1 holds data "b" whose contents correspond to one or more programs (files). In the data recording device 1, the attribute information piece a1 and the data "b" are arranged in a manner such as to be related with each other provided that the data "b" is legitimately assigned to the data recording device 1. The data recording device 1 also holds identification information about the data "b". The data recording device 1 contains, for example, a storage unit or a combination of a hard disk and its drive.

It should be noted that the data "b" may have a portion indicating a related attribute information piece.

The data "b" and the identification information about the data "b" can be stored into the data recording device 1 from an external package medium or a communication network through a suitable interface (not shown). In this case, an attribute information piece assigned to a source of supplying the data "b" is also stored into the data recording device 1 from the external package medium or the communication network. The attribute information piece concerning the data supply source and the data "b" are arranged in the data recording device 1 in a manner such as to be related with each other.

In the data using apparatus 18, the data recording device 1 feeds the data "b", the attribute information piece a1, and the data identification information to a data using device 2. An attribute information piece a3 is assigned to the data using device 2. The attribute information piece a3 is stored in a memory within the data using device 2. Provided that the data using device 2 is legitimate with respect to the data using apparatus 18, the attribute information piece a3 is identical with the attribute information piece a0. As previously mentioned, the attribute information piece a1 is normally identical with the attribute information piece a0.

According to a first example, the data using device 2 compares the fed attribute information piece a1 and the attribute-information-piece indicating portion of the data "b". When the result of the comparison indicates that the attribute information piece a1 and the attribute-information-piece indicating portion of the data "b" are the same, the data using device 2 implements the use of the data "b" (for example, the recording of the data "b", the copying of the data "b", or the playback of the contents of the data "b"). At the same time, the data using device 2 passes the attribute information piece a1 to a data use history generating device 3. On the other hand, when the result of the comparison indicates that the attribute information piece a1 and the attribute-information-piece indicating portion of the data "b" are different, the data using device 2 inhibits the use of the data "b".

According to a second example, the data using device 2 compares the fed attribute information piece a1 and the assigned attribute information piece a3. When the result of the comparison indicates that the attribute information pieces a1 and a3 are the same, the data using device 2 implements the use of the data "b" (for example, the recording of the data "b", the copying of the data "b", or the playback of the contents of the data "b"). At the same time, the data using device 2 passes the attribute information piece a1 to the data use history generating device 3. On the other hand, when the result of the comparison indicates that the attribute information pieces a1 and a3 are different, the data using device 2 inhibits the use of the data "b".

The data using device 2 has identification information thereabout. The data using device 2 is notified of identification information about the data using apparatus 18. The data using device 2 generates data use information "c" in accordance with the use of the data "b" therein, the data identification information, and the apparatus identification information. The data use information "c" means information basically representing the conditions of the use of the data "b" in the data using device 2. Preferably, the data use information "c" has a piece representing the starting time c1 of the data use, a piece representing the ending time c2 of the data use, a piece containing the identification information c3 about the data "b", and a piece containing the identification information c4 about the data using apparatus 18 or the data using device 2. The data using device 2 feeds the data use information "c" to the data use history generating device 3. The data using device 2 contains, for example, a data recording device, a data copying device, a data reproducing device, or a data player.

The data use history generating device 3 produces data use history information "ct" in response to the data use information "c". For example, the data use history generating device 3 updates the data use history information "ct" in response to the data use information "c". Specifically, the data use history generating device 3 adds the data use information "c" to the old data use history information "ct" to get the new data use history information "ct". The data use history information "ct" means information basically representing the use history of the data "b". The data use history generating device 3 feeds the data use history information "ct" to a data use history information recording device 4. The data use history generating device 3 passes the attribute information piece a1 to the data use history information recording device 4.

The data use history information recording device 4 stores the data use history information "ct" and the attribute information piece a1 therein. The data use history information recording device 4 contains, for example, a memory or a storage unit.

Figure 2:
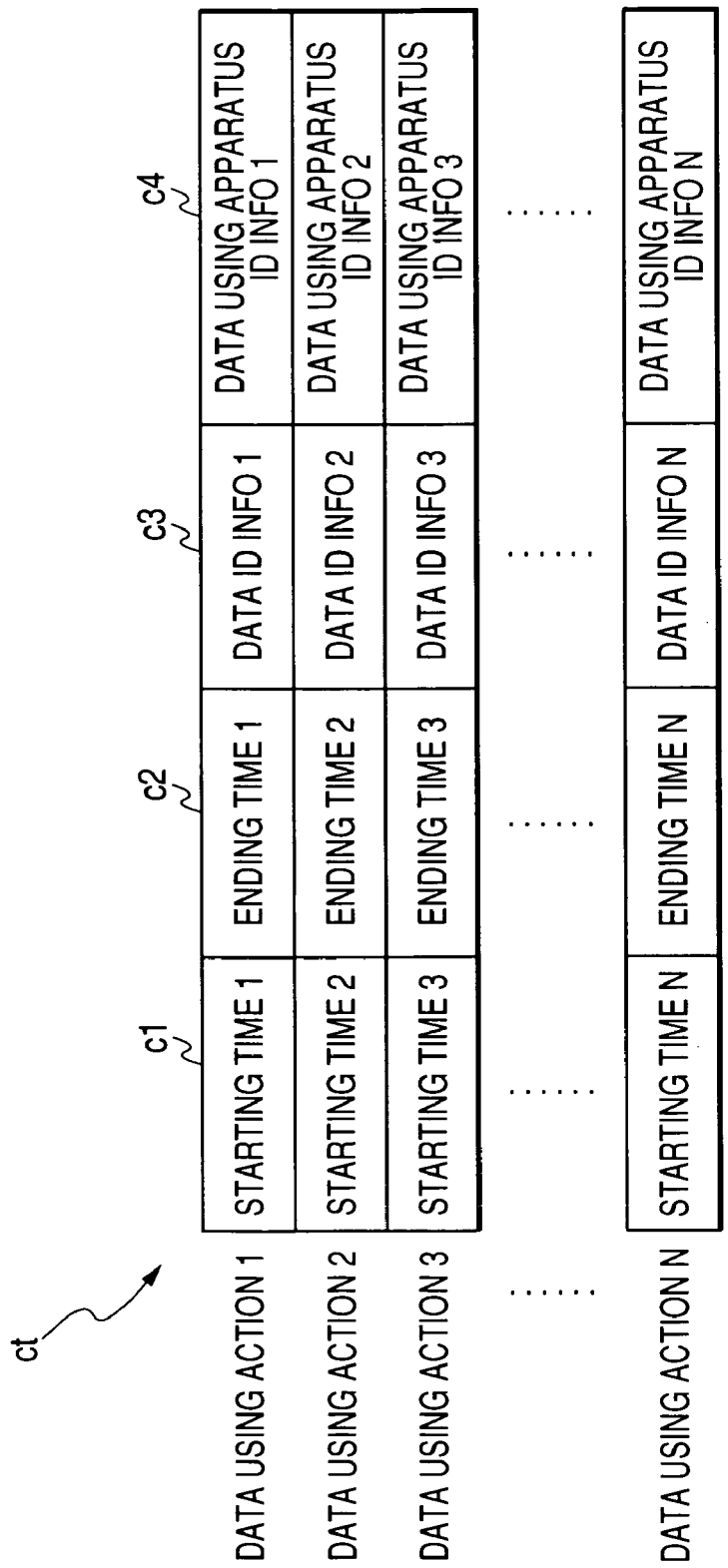
FIG. 2 is a diagram of the structure of data use history information in the first embodiment of this invention.

FIG. 2 shows the structure of the data use history information "ct". As shown in FIG. 2, the data use history information "ct" is divided into row segments assigned to respective data using actions (for example, data recording actions) "1", "2", . . . , "N" performed by the data using device 2 or other data using devices. Each of the history-information row segments corresponds to data use information "c" generated by the data using device 2 or another data using device. Specifically, each of the history-information row segments has a piece representing the starting time c1 of the related data use, a piece representing the ending time c2 of the related data use, a piece containing identification information c3 about the related data, and a piece containing identification information c4 about a data using apparatus or a data using device (for example, the data using apparatus 18 or the data using device 2) implementing the related data use. The data-use starting time c1 and the data-use ending time c2 are expressed in units of year, month, day, hour, minute, and second. The data-use starting time c1 and the data-use ending time c2 may be expressed in other units. It should be noted that the data identification information c3 may be omitted from each row segment of the data use history information "ct".

With reference back to FIG. 1, the data using apparatus 18 includes a sending device 5 and a receiving device 6. The data using apparatus 18 can be connected with another data using apparatus 14. The data using apparatus 14 may be similar in structure to the data using apparatus 18. When the data using apparatus 18 is connected with the data using apparatus 14, the sending device 5 and the receiving device 6 in the data using apparatus 18 are coupled with a receiving device and a sending device in the data using apparatus 14 respectively.

In the data using apparatus 18, the data use history information recording device 4 feeds the data use history information "ct" and the attribute information piece a1 to the sending device 5. When the data using apparatus 18 is connected with the data using apparatus 14, the sending device 5 in the data using apparatus 18 sends the data use history information "ct" and the attribute information piece a1 to the data using apparatus 14. The receiving device 6 in the data using apparatus 18 receives data use history information "cr" and an attribute information piece a2 from the data using apparatus 14.

The receiving device 6 reads out the attribute information piece a0 from the attribute information recording device 8 provided that the use of the attribute information piece a0 is allowed. The receiving device 6 includes a comparator for deciding whether or not the attribute information pieces a0 and a2 are the same. When the attribute information pieces a0 and a2 are the same, the receiving device 6 passes the data use history information "cr" to a data use history comparing device 7. On the other hand, when the attribute information pieces a0 and a2 are not the same, the receiving device 6 does not pass the data use history information "cr" to the data use history comparing device 7. When the use of the attribute information piece a0 is inhibited, the receiving device 6 does not pass the data use history information "cr" to the data use history comparing device 7.

In the data using apparatus 18, the data use history comparing device 7 reads out the data use history information "ct" from the data use history information recording device 4. The data use history comparing device 7 compares the data use history information "ct" and the data use history information "cr". Specifically, the data use history comparing device 7 refers to the data-use starting time c1 and the data-use ending time c2 in each of the row segments of the data use history information "ct", and calculates the data use term Tct between the data-use starting time c1 and the data-use ending time c2. Thus, the data use history comparing device 7 gets the data use terms Tct1, Tct2, . . . , TctN of data using actions corresponding to the respective row segments of the data use history information "ct". In addition, the data use history comparing device 7 refers to the data-use starting time c1 and the data-use ending time c2 in each of the row segments of the data use history information "cr", and calculates the data use term Tcr between the data-use starting time c1 and the data-use ending time c2. Thus, the data use history comparing device 7 gets the data use terms Tcr1, Tcr2, . . . , TcrM of data using actions corresponding to the respective row segments of the data use history information "cr". The data use history comparing device 7 compares the group of the data use terms Tct1, Tct2, . . . , TctN and the group of the data use terms Tcr1, Tcr2, . . . , TcrM to find overlapping data use terms in the respective groups. When overlapping data use terms are in the respective groups, the data use history comparing device 7 decides whether or not the identification information c4 in one of the history-information row segments corresponding to the overlapping data use terms denotes the data using apparatus 18. In the case where the identification information c4 in one of the history-information row segments corresponding to the overlapping data use terms denotes the data using apparatus 18, the data use history comparing device 7 issues multiple apparatus use notice information (duplicate apparatus use notice information) "d" to a control device 9. Otherwise, the data use history comparing device 7 does not issue any multiple apparatus use notice information "d".

It should be noted that the data use history comparing device 7 may be modified to perform the following operation steps. When overlapping data use terms are in the respective groups, the data use history comparing device 7 issues the multiple apparatus use notice information "d" to the control device 9. Otherwise, the data use history comparing device 7 does not issue any multiple apparatus use notice information "d".

The control device 9 generates control information "e" in response to the multiple apparatus use notice information "d". The control information "e" is designed to force the attribute information recording device 8 to limit the use of the attribute information piece a0. The control device 9 feeds the control information "e" to the attribute information recording device 8. The attribute information recording device 8 limits the use of the attribute information piece a0 in response to the control information "e". Examples of the limitation are as follows. According to a first example, the attribute information recording device 8 continuously inhibits the attribute information piece a0 from being used by the receiving device 6 for a predetermined time interval. According to a second example, the attribute information recording device 8 continuously inhibits the attribute information piece a0 from being used by the receiving device 6 until control information for cancel is received from an external apparatus. Inhibiting the use of the attribute information piece a0 means disabling the attribute information piece a0. Furthermore, the inhibition of the use of the attribute information piece a0 substantially disables the receiving device 6 so that a main portion of the data using apparatus 18 can not receive data use history information "cr" from another data using apparatus.

The data use history comparing device 7 passes the data use history information "cr" to the data use history information recording device 4. The data use history information recording device 4 stores the data use history information "cr" therein. Specifically, the data use history information recording device 4 updates the stored data use history information "ct" in response to the data use history information "cr". In more detail, the data use history information recording device 4 adds the data use history information "cr" to the old data use history information "ct" to get the new data use history information "ct".

As previously mentioned, attribute information pieces are assigned to data using apparatuses respectively. Some of the attribute information pieces assigned to the data using apparatuses are the same. The data using apparatuses having the same attribute information piece are in a group for management. The data using apparatuses in the group can be managed. A main portion of each data using apparatus in the group is inhibited from communicating with a data using apparatus outside the group. Each of the data using apparatuses holds data use history information which is updated upon the use of data. When first and second ones of the data using apparatuses in the group are connected, first data use history information is transmitted from the first apparatus to the second apparatus and second data use history information is transmitted from the second apparatus to the first apparatus. In the case where the first data use history information and the second data use history information are in specified conditions, multiple apparatus use notice information (duplicate apparatus use notice information) "d" is generated in at least one of the first and second data using apparatuses. In the first data using apparatus, the second data use history information is added to the first data use history information to form new first data use history information. Similarly, in the second data using apparatus, the first data use history information is added to the second data use history information to form new second data use history information. The new first data use history information and the new second data use history information are identical in contents with each other. In the case where connections between apparatuses in all possible pairs in the group have been performed, all the data using apparatuses in the group have the same data use history information whose components are equal to the original data use history information in the apparatuses.

Second Embodiment

A second embodiment of this invention employs attribute information pieces similar to those in the first embodiment of this invention.

Figure 3:
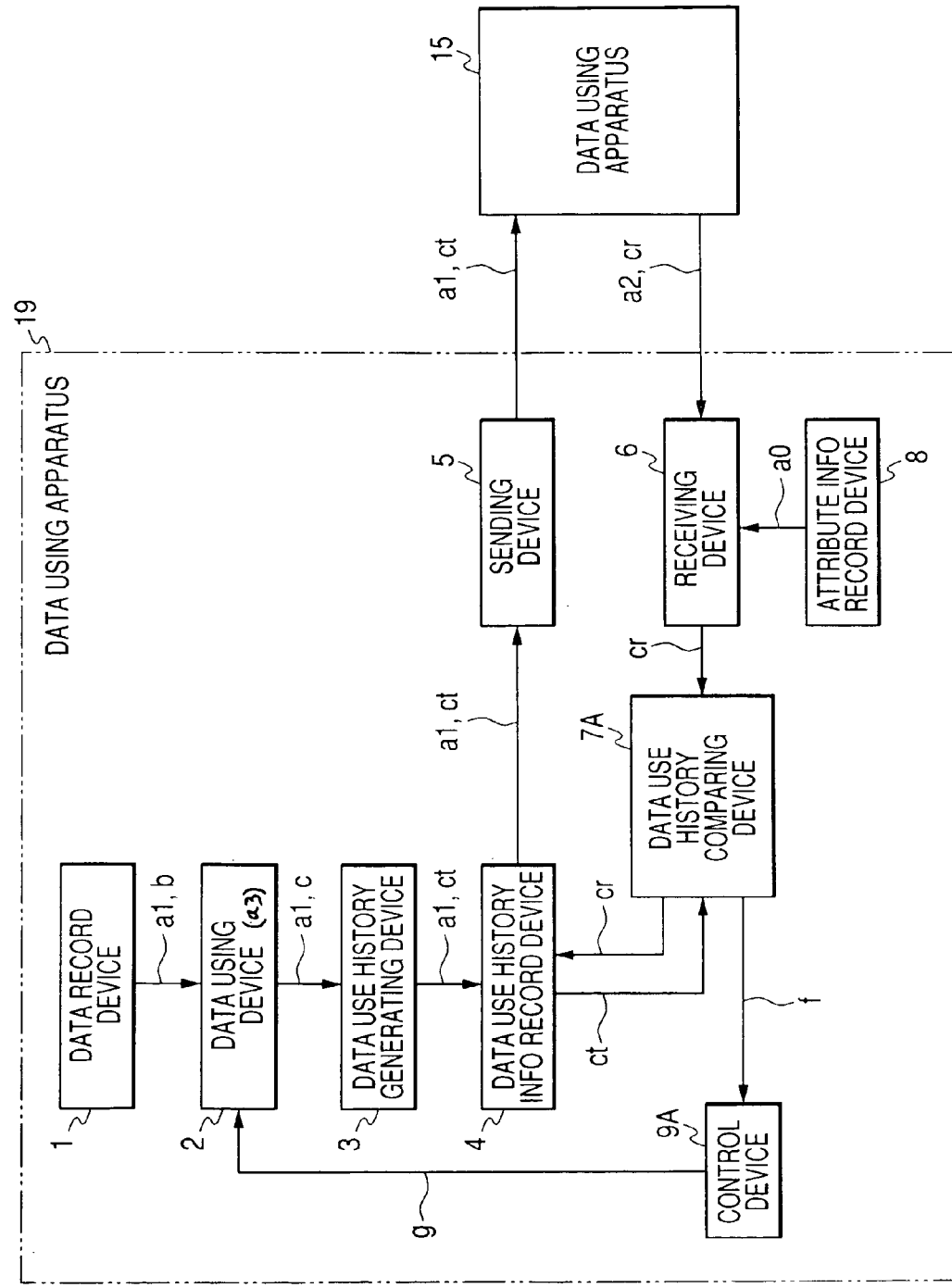
FIG. 3 is a block diagram of a data using apparatus according to a second embodiment of this invention.

FIG. 3 shows a data using apparatus 19 according to the second embodiment of this invention. The data using apparatus 19 is basically similar to the data using apparatus 18 in FIG. 1 except for design changes mentioned later. As shown in FIG. 3, the data using apparatus 19 includes an attribute information recording device 8 which holds an information piece a0 representing the attributes of the apparatus 19.

The data using apparatus 19 also includes a data recording device 1 which holds an attribute information piece a1. The data recording device 1 is assigned the attribute information piece a1. Provided that the data recording device 1 is legitimate with respect to the data using apparatus 19, the attribute information piece a1 is identical with the attribute information piece a0. The data recording device 1 holds data "b" whose contents are one or more programs (files). The data recording device 1 also holds identification information about the data "b". In the data recording device 1, the attribute information piece a1 and the data "b" are arranged in a manner such as to be related with each other provided that the data "b" is legitimately assigned to the data recording device 1.

It should be noted that the data "b" has a portion indicating a related attribute information piece.

The data "b" and the identification information about the data "b" can be stored into the data recording device 1 from an external package medium or a communication network through a suitable interface (not shown). In this case, an attribute information piece assigned to a source of supplying the data "b" is also stored into the data recording device 1 from the external package medium or the communication network. The attribute information piece concerning the data supply source and the data "b" are arranged in the data recording device 1 in a manner such as to be related with each other.

In the data using apparatus 19, the data recording device 1 feeds the data "b", the attribute information piece a1, and the data identification information to a data using device 2. An attribute information piece a3 is assigned to the data using device 2. When the data using device 2 is legitimate with respect to the data using apparatus 19, the attribute information piece a3 is identical with the attribute information piece a0. As previously mentioned, the attribute information piece a1 is normally identical with the attribute information piece a0.

According to a first example, the data using device 2 compares the fed attribute information piece a1 and the attribute-information-piece indication portion of the data "b". When the result of the comparison indicates that the attribute information piece a1 and the attribute-information-piece indication portion of the data "b" are the same, the data using device 2 implements the use of the data "b" (for example, the recording of the data "b", the copying of the data "b", or the playback of the contents of the data "b"). At the same time, the data using device 2 passes the attribute information piece a1 to a data use history generating device 3. On the other hand, when the result of the comparison indicates that the attribute information piece a1 and the attribute-information-piece indication portion of the data "b" are different, the data using device 2 inhibits the use of the data "b".

According to a second example, the data using device 2 compares the fed attribute information piece a1 and the assigned attribute information piece a3. When the result of the comparison indicates that the attribute information pieces a1 and a3 are the same, the data using device 2 implements the use of the data "b" (for example, the recording of the data "b", the copying of the data "b", or the playback of the contents of the data "b"). At the same time, the data using device 2 passes the attribute information piece a1 to the data use history generating device 3. On the other hand, when the result of the comparison indicates that the attribute information pieces a1 and a3 are different, the data using device 2 inhibits the use of the data "b".

The data using device 2 has identification information thereabout. The data using device 2 is notified of identification information about the data using apparatus 19. The data using device 2 generates data use information "c" in accordance with the use of the data "b" therein, the data identification information, and the apparatus identification information. The data use information "c" means information basically representing the conditions of the use of the data "b" in the data using device 2. Preferably, the data use information "c" has a piece representing the starting time c1 of the data use, a piece representing the ending time c2 of the data use, a piece containing the identification information c3 about the data "b", and a piece containing the identification information c4 about the data using apparatus 19 or the data using device 2. The data using device 2 feeds the data use information "c" to the data use history generating device 3.

The data use history generating device 3 produces data use history information "ct" in response to the data use information "c". For example, the data use history generating device 3 updates the data use history information "ct" in response to the data use information "c". Specifically, the data use history generating device 3 adds the data use information "c" to the old data use history information "ct" to get the new data use history information "ct". The data use history information "ct" means information basically representing the use history of the data "b". The data use history generating device 3 feeds the data use history information "ct" to a data use history information recording device 4. The data use history generating device 3 passes the attribute information piece a1 to the data use history information recording device 4.

The data use history information recording device 4 stores the data use history information "ct" and the attribute information piece a1 therein. The data use history information "ct" has a structure similar to that in FIG. 2.

As shown in FIG. 3, the data using apparatus 19 includes a sending device 5 and a receiving device 6. The data using apparatus 19 can be connected with another data using apparatus 15. The data using apparatus 15 may be similar in structure to the data using apparatus 19. When the data using apparatus 19 is connected with the data using apparatus 15, the sending device 5 and the receiving device 6 in the data using apparatus 19 are coupled with a receiving device and a sending device in the data using apparatus 15 respectively.

In the data using apparatus 19, the data use history information recording device 4 feeds the data use history information "ct" and the attribute information piece a1 to the sending device 5. When the data using apparatus 19 is connected with the data using apparatus 15, the sending device 5 in the data using apparatus 19 sends the data use history information "ct" and the attribute information piece a1 to the data using apparatus 15. The receiving device 6 in the data using apparatus 19 receives data use history information "cr" and an attribute information piece a2 from the data using apparatus 15.

The receiving device 6 reads out the attribute information piece a0 from the attribute information recording device 8 provided that the use of the attribute information piece a0 is allowed. The receiving device 6 includes a comparator for deciding whether or not the attribute information pieces a0 and a2 are the same. When the attribute information pieces a0 and a2 are the same, the receiving device 6 passes the data use history information "cr" to a data use history comparing device 7A. On the other hand, when the attribute information pieces a0 and a2 are not the same, the receiving device 6 does not pass the data use history information "cr" to the data use history comparing device 7A. When the use of the attribute information piece a0 is inhibited, the receiving device 6 does not pass the data use history information "cr" to the data use history comparing device 7A.

In the data using apparatus 19, the data use history comparing device 7A passes the data use history information "cr" to the data use history information recording device 4. The data use history information recording device 4 stores the data use history information "cr" therein. Specifically, the data use history information recording device 4 updates the stored data use history information "ct" in response to the data use history information "cr". In more detail, the data use history information recording device 4 adds the data use history information "cr" to the old data use history information "ct" to get the new data use history information "ct".

The data use history comparing device 7A reads out the updated data use history information (the new data use history information) "ct" from the data use history information recording device 4. The data use history comparing device 7A refers to the data-use starting time c1 and the data-use ending time c2 in each of the row segments of the data use history information "ct", and calculates the data use term Tct between the data-use starting time c1 and the data-use ending time c2. Thus, the data use history comparing device 7A gets the data use terms Tct1, Tct2, . . . , TctL of data using actions corresponding to the respective row segments of the data use history information "ct". The data use history comparing device 7A searches the row segments of the data use history information "ct" for ones having the same data identification information c3. In addition, the data use history comparing device 7A searches the data use terms Tct1, Tct2, . . . , TctL for overlapping ones. Then, the data use history comparing device 7A decides whether or not there are similar ones among the row segments of the data use history information "ct" which have the same data identification information c3, and which relate to overlapping data use terms. Furthermore, the data use history comparing device 7A decides whether or not one of such similar row segments of the data use history information "ct" has the identification information c4 denoting the data using apparatus 19. In the case where there are such similar row segments of the data use history information "ct" and one of the similar row segments has the identification information c4 denoting the data using apparatus 19, the data use history comparing device 7A issues multiple data use notice information (duplicate data use notice information) "f" to a control device 9A. Otherwise, the data use history comparing device 7A does not issue any multiple data use notice information "f". The multiple data use notice information "f" contains the above-indicated same data identification information c3.

The control device 9A generates control information "g" in response to the multiple data use notice information "f". The control information "g" contains the above-indicated same data identification information c3. The control information "g" is designed to force the data using device 2 to limit the use of the data "b" identified by the above-indicated same data identification information c3. The control device 9A feeds the control information "g" to the data using device 2. In response to the control information "g", the data using device 2 limits the use of the data "b" identified by the above-indicated same data identification information c3. Examples of the limitation are as follows. According to a first example, the data using device 2 continuously inhibits the use of the data "b" for a predetermined time interval. According to a second example, the data using device 2 continuously inhibits the use of the data "b" until control information for cancel is received from an external apparatus.

As previously mentioned, attribute information pieces are assigned to data using apparatuses respectively. Some of the attribute information pieces assigned to the data using apparatuses are the same. The data using apparatuses having the same attribute information piece are in a group for management. The data using apparatuses in the group can be managed. A main portion of each data using apparatus in the group is inhibited from communicating with a data using apparatus outside the group. Each of the data using apparatuses holds data use history information which is updated upon the use of data. When first and second ones of the data using apparatuses in the group are connected, first data use history information is transmitted from the first apparatus to the second apparatus and second data use history information is transmitted from the second apparatus to the first apparatus. In the first data using apparatus, the second data use history information is added to the first data use history information to form new first data use history information. Similarly, in the second data using apparatus, the first data use history information is added to the second data use history information to form new second data use history information. The new first data use history information and the new second data use history information are identical in contents with each other. When the new first data use history information is in specified conditions, multiple data use notice information (duplicate data use notice information) "f" is generated in the first data using apparatus. Similarly, when the new second data use history information is in specified conditions, multiple data use notice information (duplicate data use notice information) "f" is generated in the second data using apparatus. In the case where connections between apparatuses in all possible pairs in the group have been performed, all the data using apparatuses in the group have the same data use history information whose components are equal to the original data use history information in the apparatuses.

Third Embodiment

A third embodiment of this invention is similar to the first or second embodiment thereof (see FIG. 1 or FIG. 3) except for the following points.

Figure 4:
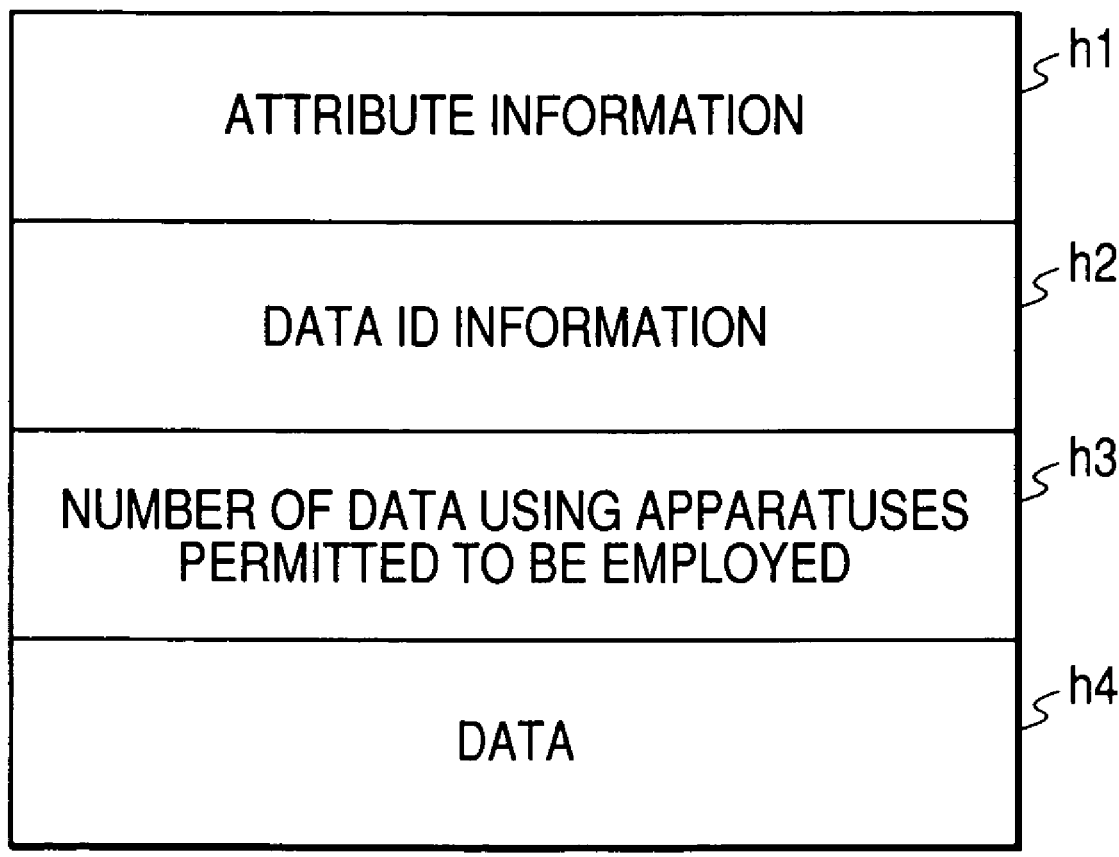
FIG. 4 is a diagram of the structure of a data container in a third embodiment of this invention.

According to the third embodiment of this invention, the data "b" and the attribute information piece a1 in the data recording device 1 are in a data container "h". As shown in FIG. 4, the data container "h" has a first section h1 loaded with the attribute information piece a1, a second section h2 loaded with identification information about the data "b", a third section h3 loaded with information representing a predetermined number of data using apparatuses permitted to be employed, and a fourth section h4 loaded with the data "b".

In the third embodiment of this invention, the data recording device 1 feeds the data "b", the attribute information piece a1, the data identification information, and the apparatus number information to the data using device 2. In the case where the data using device 2 implements the use of the data "b", the data using device 2 generates data use information "c" in accordance with the use of the data "b" therein, the data identification information, and the apparatus number information. The data use information "c" means information basically representing the conditions of the use of the data "b" in the data using device 2. Preferably, the data use information "c" has a piece representing the starting time c1 of the data use, a piece representing the ending time c2 of the data use, a piece containing identification information c3 about the data "b", a piece containing identification information c4 about the data using apparatus 18 or the data using device 2, and a piece containing information c5 representing the predetermined number of data using apparatuses permitted to be employed. The data using device 2 feeds the data use information "c" to the data use history generating device 3. The data using device 2 passes the attribute information piece a1 to the data use history generating device 3.

The data use history generating device 3 produces data use history information "ct" in response to the data use information "c". For example, the data use history generating device 3 updates the data use history information "ct" in response to the data use information "c". Specifically, the data use history generating device 3 adds the data use information "c" to the old data use history information "ct" to get the new data use history information "ct". The data use history information "ct" means information basically representing the use history of the data "b". The data use history generating device 3 feeds the data use history information "ct" to the data use history information recording device 4. The data use history generating device 3 passes the attribute information piece a1 to the data use history information recording device 4.

FIG. 5 shows the structure of the data use history information "ct" in the third embodiment of this invention. As shown in FIG. 5, the data use history information "ct" is divided into row segments assigned to respective data using actions (for example, data recording actions) "1", "2", . . . , "N" performed by the data using device 2 or other data using devices. Each of the history-information row segments corresponds to data use information "c" generated by the data using device 2 or another data using device 2. Specifically, each of the history-information row segments has a piece representing the starting time c1 of the related data use, a piece representing the ending time c2 of the related data use, a piece containing identification information c3 about the related data, a piece containing identification information c4 about a data using apparatus or a data using device (for example, the data using apparatus 18 or the data using device 2) implementing the related data use, and a piece containing information c5 representing the predetermined number of data using apparatuses permitted to be employed. The data-use starting time c1 and the data-use ending time c2 are expressed in units of year, month, day, hour, minute, and second. The data-use starting time c1 and the data-use ending time c2 may be expressed in other units. It should be noted that the data identification information c3 may be omitted from each row segment of the data use history information "ct".

In the third embodiment of this invention, the data use history comparing device 7 reads out the data use history information "ct" from the data use history information recording device 4. The data use history comparing device 7 receives the data use history information "cr" from the receiving device 6. The data use history comparing device 7 refers to the data-use starting time c1 and the data-use ending time c2 in each of the row segments of the data use history information "ct" and the data use history information "cr", and calculates the data use term Tct between the data-use starting time c1 and the data-use ending time c2. Thus, the data use history comparing device 7 gets the data use terms Tct1, Tct2, . . . , TctL of data using actions corresponding to the respective row segments of the data use history information "ct" and the data use history information "cr". The data use history comparing device 7 searches the row segments of the data use history information "ct" and the data use history information "cr" for ones having the same data identification information c3. In addition, the data use history comparing device 7 searches the data use terms Tct1, Tct2, . . . , TctL for overlapping ones. Then, the data use history comparing device 7 decides whether or not there are similar ones among the row segments of the data use history information "ct" and the data use history information "cr" which have the same data identification information c3, and which relate to overlapping data use terms. Furthermore, the data use history comparing device 7 counts such similar row segments of the data use history information "ct" and the data use history information "cr". Subsequently, the data use history comparing device 7 compares the number of the counted history-information row segments with the predetermined number of data using apparatuses permitted to be employed which corresponds to the above-indicated same data identification information c3. When the result of the comparison indicates that the number of the counted history-information row segments is greater than the predetermined number of data using apparatuses permitted to be employed, the data use history comparing device 7 issues multiple apparatus use notice information (duplicate apparatus use notice information) "d" to the control device 9. Otherwise, the data use history comparing device 7 does not issue any multiple apparatus use notice information "d".

It should be noted that multiple data use notice information (duplicate data use notice information) "f" may be generated instead of the multiple apparatus use notice information "d". In this case, the generated multiple data use notice information "f" is handled as mentioned in the second embodiment of this invention (see FIG. 3).

The data use history comparing device 7 may be modified to implement the following sequence of operation steps. The data use history comparing device 7 searches the data use terms Tct1, Tct2, . . . , TctL for overlapping ones. The data use history comparing device 7 counts row segments of the data use history information "ct" and the data use history information "cr" which correspond to the overlapping data use terms. Subsequently, the data use history comparing device 7 compares the number of the counted history-information row segments with the predetermined numbers of data using apparatuses permitted to be employed which are represented by the apparatus number information c5 in the counted history-information row segments. When the result of the comparison indicates that the number of the counted history-information row segments is greater than any of the predetermined numbers of data using apparatuses permitted to be employed, the data use history comparing device 7 issues multiple apparatus use notice information (duplicate apparatus use notice information) "d" to the control device 9 provided that the data using apparatus 18 is the same as one of apparatuses denoted by the apparatus identification information c4 in the counted history-information row segments. Otherwise, the data use history comparing device 7 does not issue any multiple apparatus use notice information "d".

Figures 6, 7:
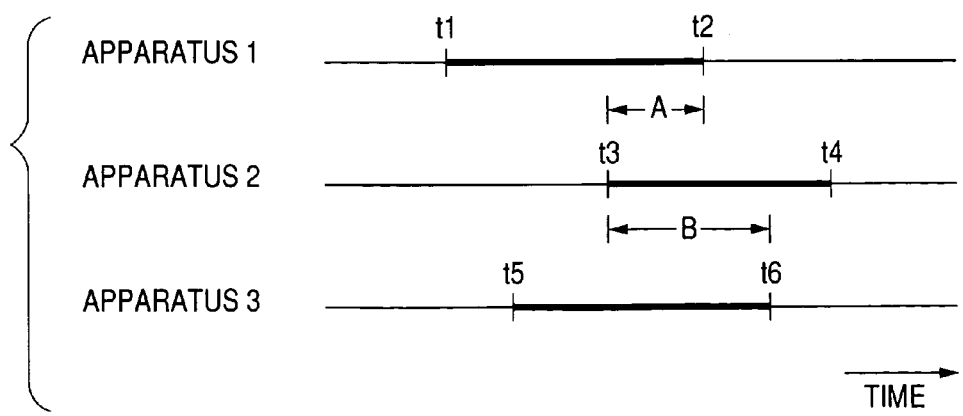
FIG. 6 is a diagram of a portion of data use history information indicating that there are three data using apparatuses.
FIG. 7 is a time-domain diagram showing an example of the conditions of the multiple use of data which corresponds to the data use history information in FIG. 6.

It is possible to grant a license to use data in multiple on a data-by-data basis. FIG. 6 shows an example of a portion of the data use history information "ct" or "cr" indicating that there are three data using apparatuses "1", "2", and "3". The data use history information in FIG. 6 has first, second, and third row segments corresponding to data using actions "1", "2", and "3" respectively.

In FIG. 6, the first history-information row segment represents that data-use starting time c1 and data-use ending time c2 are moments t1 and t2 respectively. The first history-information row segment has apparatus identification information c4 denoting the data using apparatus "1". The first history-information row segment has number information c5 representing that the predetermined number of data using apparatuses permitted to be employed is equal to 3. The second history-information row segment represents that data-use starting time c1 and data-use ending time c2 are moments t3 and t4 respectively. The second history-information row segment has apparatus identification information c4 denoting the data using apparatus "2". The second history-information row segment has number information c5 representing that the predetermined number of data using apparatuses permitted to be employed is equal to 1. The third history-information row segment represents that data-use starting time c1 and data-use ending time c2 are moments t5 and t6 respectively. The third history-information row segment has apparatus identification information c4 denoting the data using apparatus "3". The third history-information row segment has number information c5 representing that the predetermined number of data using apparatuses permitted to be employed is equal to 1.

FIG. 7 shows an example of the conditions of the multiple use of data which corresponds to the data use history information in FIG. 6. As shown in FIG. 7, the moments t1, t5, t3, t2, t6, and t4 are arranged in that order along time base. The data use by the data using apparatus "1", the data use by the data using apparatus "2", and the data use by the data using apparatus "3" entirely overlap each other during the time interval "A" between the moments t3 and t2. Thus, the multiplicity of the data use is equal to 3 during the time interval "A". As shown in FIG. 6, the predetermined number represented by the number information c5 concerning the data using apparatus "1" is equal to 3. Therefore, the multiplicity of the data use does not exceed the predetermined number represented by the number information c5 concerning the data using apparatus "1" during the time interval "A". Accordingly, any multiple apparatus use notice information "d" is not generated in the data using apparatus "1". The data use by the data using apparatus "2" and the data use by the data using apparatus "3" entirely overlap each other during the time interval "B" between the moments t3 and t6. Thus, the multiplicity of the data use is equal to at least 2 during the time interval "B". As shown in FIG. 6, the predetermined number represented by the number information c5 concerning each of the data using apparatuses "2" and "3" is equal to 1. Therefore, the multiplicity of the data use exceeds the predetermined number represented by the number information c5 concerning each of the data using apparatuses "2" and "3" during the time interval "B". Accordingly, multiple apparatus use notice information "d" is generated in each of the data using apparatuses "2" and "3".

Fourth Embodiment

A fourth embodiment of this invention is similar to the second embodiment thereof (see FIG. 3) except that the data "b" and the attribute information piece a1 in the data recording device 1 are in the data container "h" (see FIG. 4).

Fifth Embodiment

A fifth embodiment of this invention is similar to the second embodiment thereof (see FIG. 3) except for design changes mentioned later.

According to the fifth embodiment of this invention, the data use history comparing device 7A decides whether or not there are similar ones among the row segments of the data use history information "ct" which have the same data identification information c3, and which relate to overlapping data use terms. In the case where there are such similar row segments of the data use history information "ct", the data use history comparing device 7A issues multiple data use notice information (duplicate data use notice information) "f" to the control device 9A. Otherwise, the data use history comparing device 7A does not issue any multiple data use notice information "f". The multiple data use notice information "f" contains the above-indicated same data identification information c3.

Sixth Embodiment

A sixth embodiment of this invention is similar to one of the first to fifth embodiments thereof except for design changes mentioned hereafter.

Figure 8:
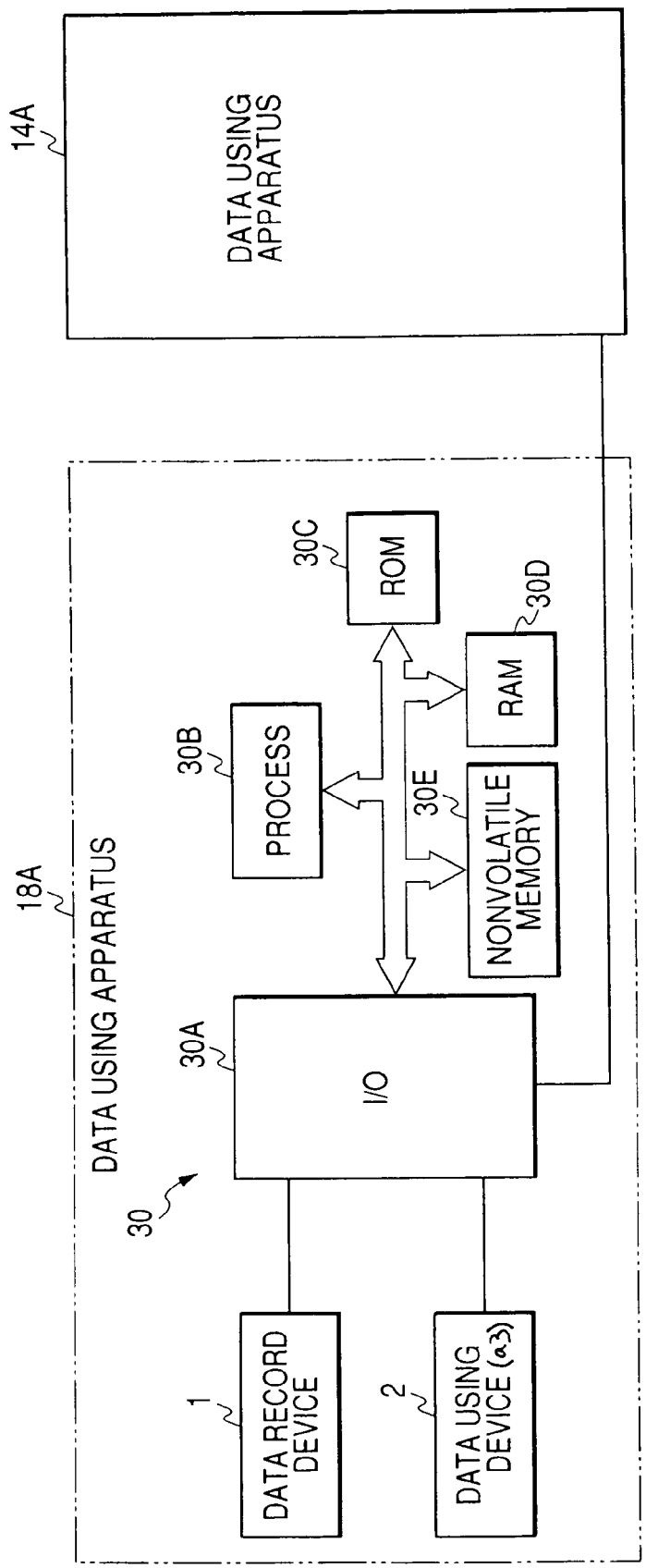
FIG. 8 is a block diagram of a data using apparatus according to a sixth embodiment of this invention.

FIG. 8 shows a data using apparatus 18A according to the sixth embodiment of this invention. With reference to FIG. 8, the data using apparatus 18A includes a data recording device 1, a data using device 2, and a control circuit 30. The data recording device 1 and the data using device 2 are connected with the control circuit 30.

The control circuit 30 includes an input/output port (interface) 30A, a processing unit 30B, a ROM 30C, a RAM 30D, and a nonvolatile memory 30E connected to constitute a computer system. The control circuit 30 operates in accordance with a control program stored in the ROM 30C. An attribute information piece a0 assigned to the data using apparatus 18A is stored in the ROM 30C. Apparatus identification information c4 assigned to the data using apparatus 18A is also stored in the ROM 30C. Data use history information "ct" is stored in the nonvolatile memory 30E. The input/output port 30A is connected with the data recording device 1 and the data using device 2.

The data recording device 1 holds data "b", an attribute information piece a1, identification information c3 about the data "b", and information c5 representing a predetermined number of data using apparatuses permitted to be employed. It should be noted that the data "b" has a portion indicating a related attribute information piece.

The data using device 2 includes a memory loaded with an attribute information piece a3 assigned thereto and also apparatus identification information c4 assigned thereto.

The data using apparatus 18A can be connected with another data using apparatus 14A. The data using apparatus 14A may be similar in structure to the data using apparatus 18A. When the data using apparatuses 18A is connected with the data using apparatus 14A, the input/output port 30A in the data using apparatus 18A is coupled with an input/output port in the data using apparatus 14A.

Figure 9:
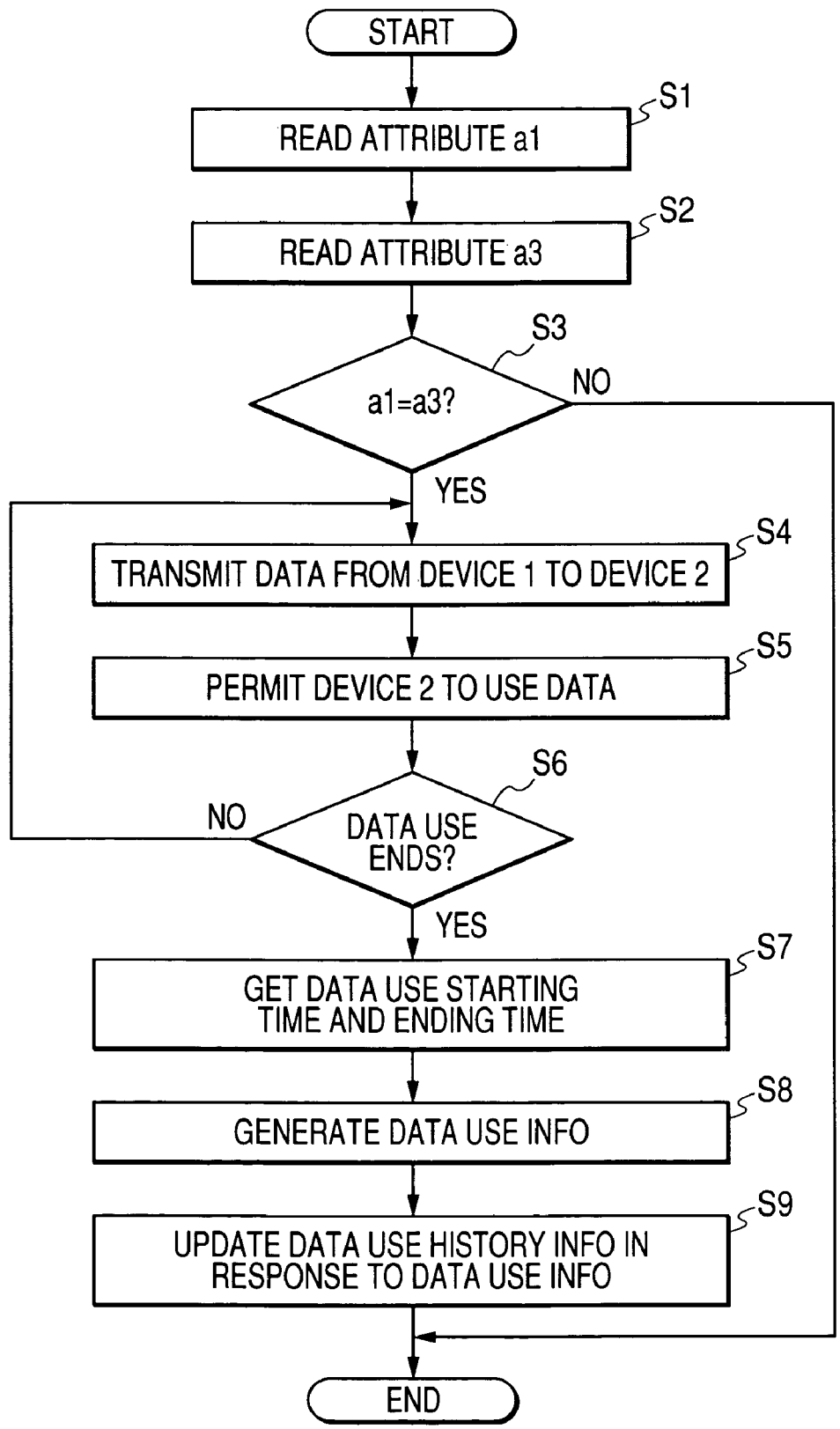
FIG. 9 is a flowchart of a first segment of a control program for a control circuit in FIG. 8.

As previously mentioned, the control circuit 30 operates in accordance with the control program stored in the ROM 30C. FIG. 9 shows a first segment of the control program which is started when the data using device 2 requests the control circuit 30 to give data.

As shown in FIG. 9, a first step S1 of the program segment reads out the attribute information piece a1 from the data recording device 1.

A step S2 following the step S1 reads out the attribute information piece a3 from the memory within the data using device 2.

A step S3 is subsequent to the step S2. A first example of the step S3 is designed as follows. The step S3 decides whether or not the attribute information piece a 1 and the attribute-information-piece indicating portion of the data "b" are the same. When the attribute information piece a1 and the attribute-information-piece indicating portion of the data "b" are the same, the program advances from the step S3 to a step S4. Otherwise, the program exits from the step S3 and then the current execution cycle of the program segment ends.

A second example of the step S3 is designed as follows. The step S3 decides whether or not the attribute information pieces a1 and a3 are the same. When the attribute information pieces a1 and a3 are the same, the program advances from the step S3 to the step S4. Otherwise, the program exits from the step S3 and then the current execution cycle of the program segment ends.

The step S4 controls the data recording device 1 to transmit the data "b" to the data using device 2.

The step S5 following the step S4 permits the data using device 2 to use the data "b".

A step S6 subsequent to the step S5 checks operating conditions of the data using device 2 to decide whether or not the use of the data "b" ends. When the use of the data "b" ends, the program advances from the step S6 to a step S7. Otherwise, the program returns from the step S6 to the step S4.

The step S7 gets information representing the starting time c1 of the use of the data "b", and information representing the ending time c2 of the use of the data "b".

A step S8 following the step S7 reads out the data identification information c3 and the apparatus number information c5 from the data recording device 1. The step S8 retrieves the identification information c4 for the data using apparatus 18A. Alternatively, the step S8 may read out the identification information c4 for the data using device 2 from the memory within the data using device 2. The step S8 generates data use information "c" which has a piece representing the starting time c 1 of the data use, a piece representing the ending time c2 of the data use, a piece containing the identification information c3 about the data "b", a piece containing the identification information c4 about the data using apparatus 18 or the data using device 2, and a piece containing the information c5 representing the predetermined number of data using apparatuses permitted to be employed.

A step S9 subsequent to the step S8 updates the data use history information "ct" in the nonvolatile memory 30E in response to the data use information "c". Specifically, the step S9 adds the data use information "c" to the old data use history information "ct" to get the new data use history information "ct". In addition, the step S9 stores the attribute information piece a1 into the nonvolatile memory 30E. After the step S9, the current execution cycle of the program segment ends.

Figure 10:
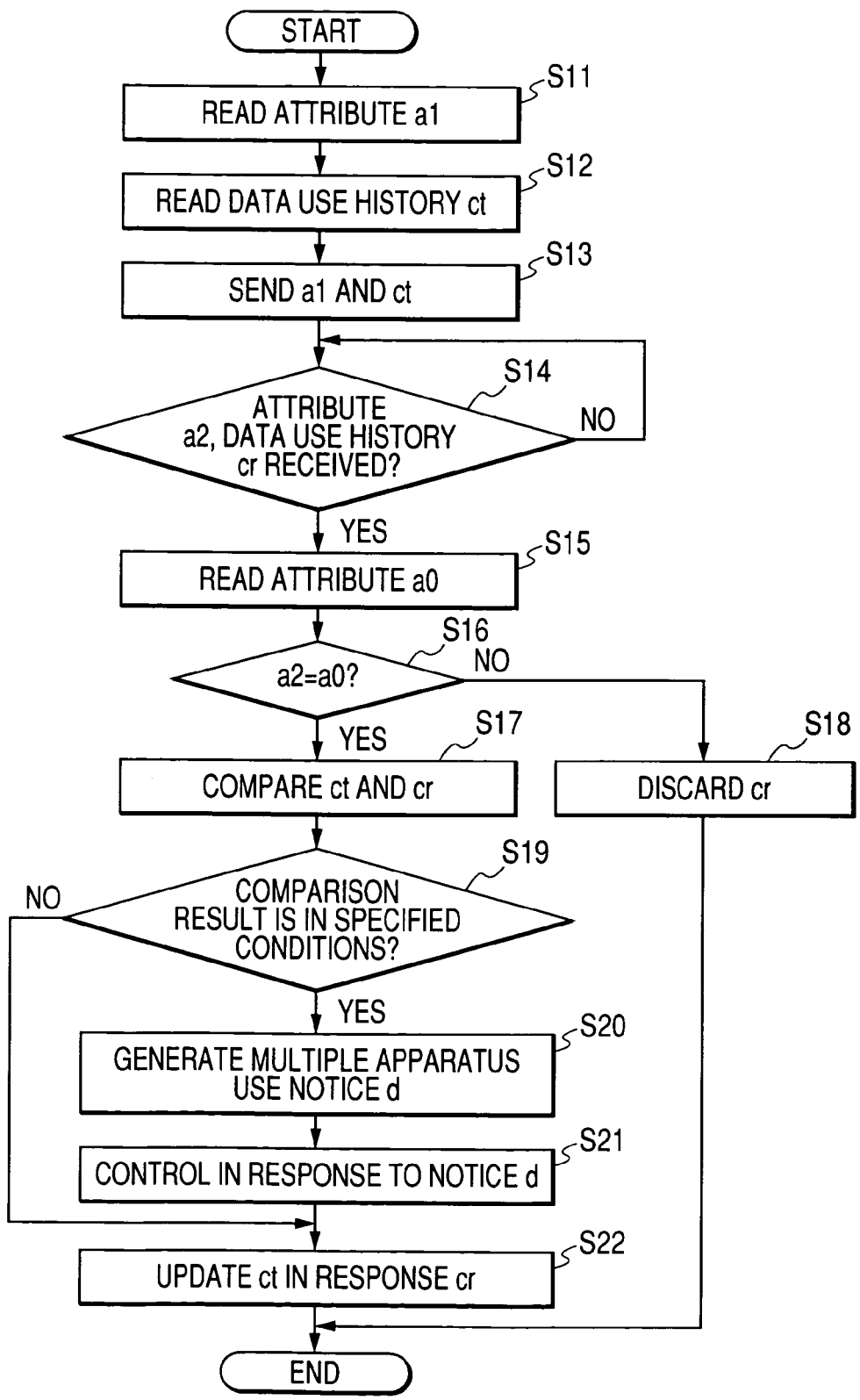
FIG. 10 is a flowchart of a second segment of the control program.

FIG. 10 shows a second segment of the control program for the control circuit 30 which is started when the data using apparatus 18A is connected with another data using apparatus (an opposite-party apparatus).

As shown in FIG. 10, a first step S11 of the program segment reads out the attribute information piece a1 from the nonvolatile memory 30E.

A step S12 following the step S11 reads out the data use history information "ct" from the nonvolatile memory 30E.

A step S13 subsequent to the step S12 sends the attribute information piece a1 and the data use history information "ct" to the opposite-party apparatus. After the step S13, the program advances to a step S14.

The step S14 decides whether or not an attribute information piece a2 and data use history information "cr" are received from the opposite-party apparatus. When the attribute information piece a2 and the data use history information "cr" are received, the program advances from the step S14 to a step S15. Otherwise, the step S14 is repeated.

The step S15 reads out the attribute information piece a0 from the ROM 30C.

A step S16 following the step S15 decides whether or not the attribute information pieces a0 and a2 are the same. When the attribute information pieces a0 and a2 are the same, the program advances from the step S16 to a step S17. Otherwise, the program advances from the step S16 to a step S18.

The step S18 discards the data use history information "cr". After the step S18, the current execution cycle of the program segment ends.

The step S17 compares the data use history information "ct" and the data use history information "cr". Specifically, the step S17 refers to the data-use starting time c1 and the data-use ending time c2 in each of the row segments of the data use history information "ct", and calculates the data use term Tct between the data-use starting time c1 and the data-use ending time c2. Thus, the step S17 gets the data use terms Tct1, Tct2, ..., TctN of data using actions corresponding to the respective row segments of the data use history information "ct". In addition, the step S17 refers to the data-use starting time c1 and the data-use ending time c2 in each of the row segments of the data use history information "cr", and calculates the data use term Tcr between the data-use starting time c1 and the data-use ending time c2. Thus, the step S17 gets the data use terms Tcr1, Tcr2, ..., TcrM of data using actions corresponding to the respective row segments of the data use history information "cr". The step S17 compares the group of the data use terms Tct1, Tct2, ..., TctN and the group of the data use terms Tcr1, Tcr2, ..., TcrM to find overlapping data use terms in the respective groups.

A step S19 following the step S17 decides whether or not the result of the comparison by the step S17 indicates that overlapping data use terms are in the respective groups. When the comparison result does not indicate that overlapping data use terms are in the respective groups, the program advances from the step S19 to a step S22. When the comparison result indicates that overlapping data use terms are in the respective groups, the step S19 decides whether or not the identification information c4 in one of the history-information row segments corresponding to the overlapping data use terms denotes the data using apparatus 18A. In the case where the identification information c4 in one of the history-information row segments corresponding to the overlapping data use terms denotes the data using apparatus 18, the program advances from the step S19 to a step S20. Otherwise, the program advances from the step S19 to the step S22.

The step S20 generates multiple apparatus use notice information (duplicate apparatus use notice information) "d".

A step S21 subsequent to the step S20 generates control information "e" in response to the multiple apparatus use notice information "d". The step S21 limits the read-out of the attribute information piece a0 from the ROM 30C in response to the control information "e". Examples of the limitation are as follows. According to a first example, the step S21 continuously inhibits the read-out of the attribute information piece a0 from the ROM 30C for a predetermined time interval. According to a second example, the step S21 continuously inhibits the read-out of the attribute information piece a0 from the ROM 30C until control information for cancel is received from an external apparatus. Inhibiting the read-out of the attribute information piece a0 means disabling the attribute information piece a0. After the step S21, the program advances to the step S22.

The step S22 stores the data use history information "cr" into the nonvolatile memory 30E. Specifically, the step S22 updates the data use history information "ct" in the nonvolatile memory 30E in response to the data use history information "cr". In more detail, the step S22 adds the data use history information "cr" to the old data use history information "ct" to get the new data use history information "ct". After the step S22, the current execution cycle of the program segment ends.

It should be noted that the step S19 may be modified to perform the following actions. The step S19 decides whether or not the result of the comparison by the step S17 indicates that overlapping data use terms are in the respective groups. When the comparison result indicates that overlapping data use terms are in the respective groups, the program advances from the step S19 to the step S20. On the other hand, when the comparison result does not indicate that overlapping data use terms are in the respective groups, the program advances from the step S19 to the step S22.

Figure 11:
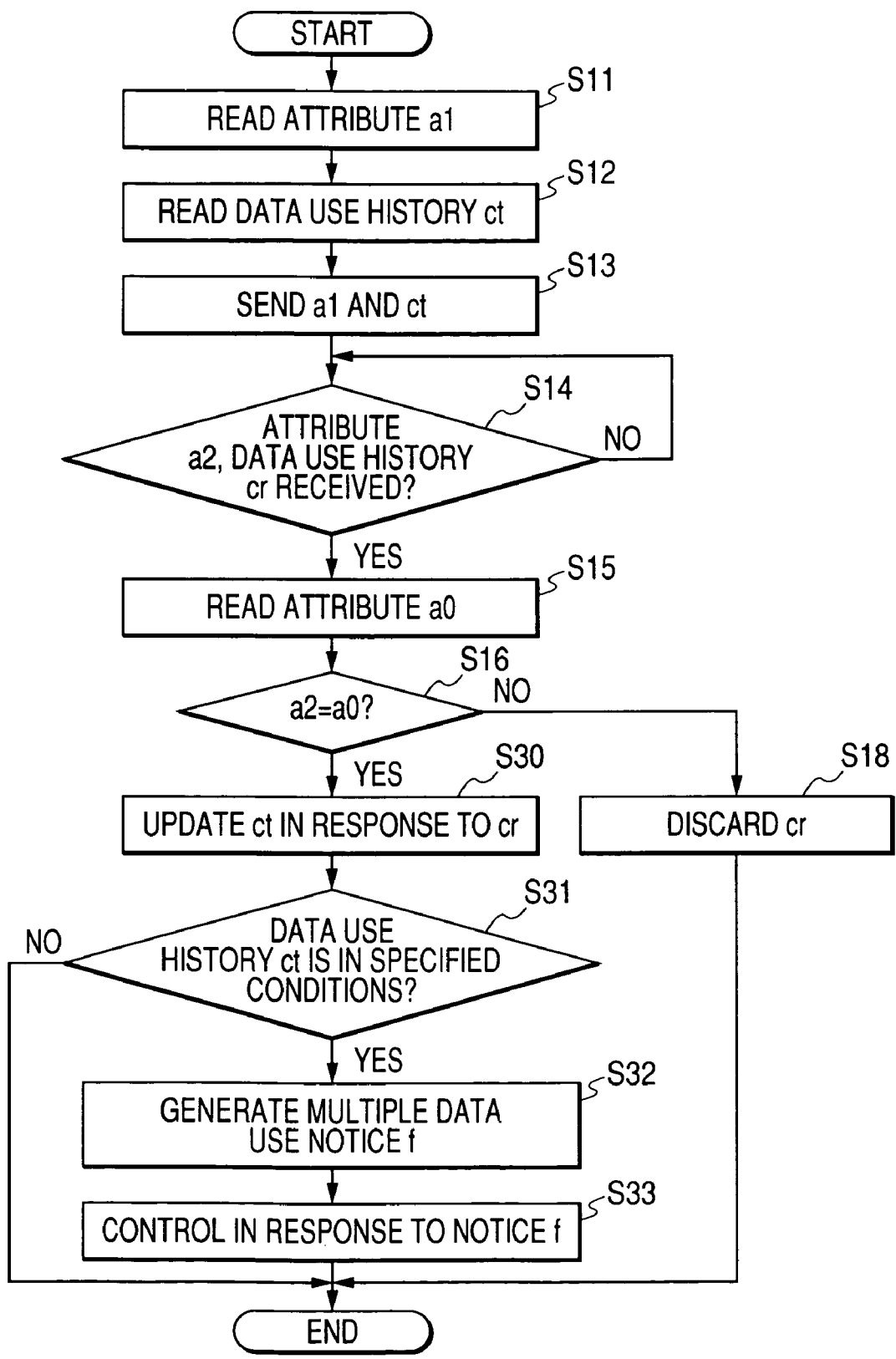
FIG. 11 is a flowchart of a segment of the control program which may replace the program segment in FIG. 10.

FIG. 11 shows a segment of the control program for the control circuit 30 which may replace the program segment in FIG. 10. The program segment in FIG. 11 differs from that in FIG. 10 as mentioned hereafter.

With reference to FIG. 11, the step S16 decides whether or not the attribute information pieces a0 and a2 are the same. When the attribute information pieces a0 and a2 are the same, the program advances from the step S16 to a step S30. Otherwise, the program advances from the step S16 to the step S18.

The step S30 stores the data use history information "cr" into the nonvolatile memory 30E. Specifically, the step S30 updates the data use history information "ct" in the nonvolatile memory 30E in response to the data use history information "cr". In more detail, the step S30 adds the data use history information "cr" to the old data use history information "ct" to get the new data use history information "ct".

A step S31 following the step S30 reads out the updated data use history information (the new data use history information) "ct" from the nonvolatile memory 30E. The step S31 refers to the data-use starting time c1 and the data-use ending time c2 in each of the row segments of the data use history information "ct", and calculates the data use term Tct between the data-use starting time c1 and the data-use ending time c2. Thus, the step S31 gets the data use terms Tct1, Tct2, ..., TctL of data using actions corresponding to the respective row segments of the data use history information "ct". The step S31 searches the row segments of the data use history information "ct" for ones having the same data identification information c3. In addition, the step S31 searches the data use terms Tct1, Tct2, ..., TctL for overlapping ones. Then, the step S31 decides whether or not there are similar ones among the row segments of the data use history information "ct" which have the same data identification information c3, and which relate to overlapping data use terms. Furthermore, the step S31 decides whether or not one of such similar row segments of the data use history information "ct" has the identification information c4 denoting the data using apparatus 18A. In the case where there are such similar row segments of the data use history information "ct" and one of the similar row segments has the identification information c4 denoting the data using apparatus 18A, the program advances from the step S31 to a step S32. Otherwise, the program exits from the step S31 and then the current execution cycle of the program segment ends.

The step S32 generates multiple data use notice information (duplicate data use notice information) "f". The multiple data use notice information "f" contains the above-indicated same data identification information c3.

A step S33 following the step S32 generates control information "g" in response to the multiple data use notice information "f". The control information "g" contains the above-indicated same data identification information c3. In response to the control information "g", the step S33 forces the data using device 2 to limit the use of the data "b" identified by the above-indicated same data identification information c3. Examples of the limitation are as follows. According to a first example, the data using device 2 continuously inhibits the use of the data "b" for a predetermined time interval. According to a second example, the data using device 2 continuously inhibits the use of the data "b" until control information for cancel is received from an external apparatus. After the step S33, the current execution cycle of the program segment ends.

It should be noted that the step S31 may be modified to perform the following actions. The step S31 reads out the updated data use history information (the new data use history information) "ct" from the nonvolatile memory 30E. The step S31 refers to the data-use starting time c1 and the data-use ending time c2 in each of the row segments of the data use history information "ct", and calculates the data use term Tct between the data-use starting time c1 and the data-use ending time c2. Thus, the step S31 gets the data use terms Tct1, Tct2, ..., TctL of data using actions corresponding to the respective row segments of the data use history information "ct". The step S31 searches the row segments of the data use history information "ct" for ones having the same data identification information c3. In addition, the step S31 searches the data use terms Tct1, Tct2, ..., TctL for overlapping ones. Then, the step S31 decides whether or not there are similar ones among the row segments of the data use history information "ct" which have the same data identification information c3, and which relate to overlapping data use terms. In the case where there are similar ones among the row segments of the data use history information "ct" which have the same data identification information c3, and which relate to overlapping data use terms, the program advances from the step S31 to the step S32. Otherwise, the program exits from the step S31 and then the current execution cycle of the program segment ends.

It should be noted that the steps S31, S32, and S33 may be modified to perform the following actions. The step S31 decides whether or not there are similar ones among the row segments of the data use history information "ct" which have the same data identification information c3, and which relate to overlapping data use terms. Furthermore, the step S31 counts such similar row segments of the data use history information "ct". Subsequently, the step S31 compares the number of the counted history-information row segments with the predetermined number of data using apparatuses permitted to be employed which corresponds to the above-indicated same data identification information c3. When the result of the comparison indicates that the number of the counted history-information row segments is greater than the predetermined number of data using apparatuses permitted to be employed, the program advances from the step S31 to the step S32. Otherwise, the program exits from the step S31 and then the current execution cycle of the program segment ends. The step S32 generates multiple apparatus use notice information (duplicate apparatus use notice information) "d". Alternatively, the step S32 may generate multiple data use notice information (duplicate data use notice information) "f". The step S33 generates control information "e" in response to the multiple apparatus use notice information "d". The step S33 limits the read-out of the attribute information piece a0 from the ROM 30C in response to the control information "e". Examples of the limitation are similar to the previously-mentioned ones. In the case where the step S32 generates the multiple data use notice information "f" rather than the multiple apparatus use notice information "d", the step S33 generates control information "g" in response to the multiple data use notice information "f". The control information "g" contains the above-indicated same data identification information c3. In response to the control information "g", the step S33 forces the data using device 2 to limit the use of the data "b" identified by the above-indicated same data identification information c3. Examples of the limitation are similar to the previously-mentioned ones.

What is claimed is:

1. A data using apparatus comprising:
  a data recording device for recording data;
  a data using device for using data recorded by the data recording device;
  first means for generating first data use history information in accordance with every actual use of data by the data using device, the first data use history information representing a starting time and an ending time of every actual use of data by the data using device;
  second means for sending the first data use history information generated by the first means toward an external apparatus;
  third means for receiving second data use history information from the external apparatus;
  fourth means for calculating first data use terms between the starting times and the ending times represented by the first data use history information;
  fifth means for calculating second data use terms between starting times and ending times represented by the second data use history information received by the third means;
  sixth means for deciding whether or not at least one of the first data use terms calculated by the fourth means and at least one of the second data use terms calculated by the fifth means at least partially overlap each other; and
  seventh means for generating multiple apparatus use notice information when the sixth means decides that at least one of the first data use terms and at least one of the second data use terms at least partially overlap each other.

2. A data using apparatus comprising:
  a data recording device for recording data;
  a data using device for using data recorded by the data recording device;

first means for generating first data use history information in accordance with every actual use of data by the data using device, the first data use history information representing a starting time and an ending time of every actual use of data by the data using device;
second means for sending the first data use history information generated by the first means toward an external apparatus;
third means for receiving second data use history information from the external apparatus;
fourth means for combining the first data use history information and the second data use history information received by the third means into third data use history information;
fifth means for calculating data use terms between starting times and ending times represented by the third data use history information generated by the fourth means;
sixth means for deciding whether or not at least two of the data use terms calculated by the fifth means at least partially overlap each other; and
seventh means for generating multiple apparatus use notice information when the sixth means decides that at least two of the data use terms at least partially overlap each other.

3. A data using apparatus comprising:
a data recording device for recording data;
a data using device for using data recorded by the data recording device;
first means for generating first data use history information in accordance with every actual use of data by the data using device, the first data use history information representing a starting time and an ending time of every actual use of data by the data using device and data identification information about data undergoing every actual use;
second means for sending the first data use history information generated by the first means toward an external apparatus;
third means for receiving second data use history information from the external apparatus;
fourth means for combining the first data use history information and the second data use history information received by the third means into third data use history information;
fifth means for calculating data use terms between starting times and ending times represented by the third data use history information generated by the fourth means;
sixth means for deciding whether or not at least two of the data use terms calculated by the fifth means at least partially overlap each other;
seventh means for deciding whether or not overlapping data use terms correspond to same data identification information when the sixth means decides that at least two of the data use terms at least partially overlap each other; and
eighth means for generating multiple data use notice information when the sixth means decides that at least two of the data use terms at least partially overlap each other, and when the seventh means decides that overlapping data use terms correspond to same data identification information.

4. A data using apparatus comprising:
a data recording device for recording data;
a data using device for using data recorded by the data recording device;
first means for generating first data use history information in accordance with every actual use of data by the data using device, the first data use history information representing a starting time and an ending time of every actual use of data by the data using device, data identification information about data undergoing every actual use, and apparatus identification information about the present apparatus and related to every actual use of data;
second means for sending the first data use history information generated by the first means toward an external apparatus;
third means for receiving second data use history information from the external apparatus;
fourth means for combining the first data use history information and the second data use history information received by the third means into third data use history information;
fifth means for calculating data use terms between starting times and ending times represented by the third data use history information generated by the fourth means;
sixth means for deciding whether or not at least two of the data use terms calculated by the fifth means at least partially overlap each other;
seventh means for deciding whether or not overlapping data use terms correspond to same data identification information when the sixth means decides that at least two of the data use terms at least partially overlap each other;
eighth means for deciding whether or not overlapping data use terms correspond to same apparatus identification information denoting the present apparatus; and
ninth means for generating multiple data use notice information when the sixth means decides that at least two of the data use terms at least partially overlap each other, when the seventh means decides that overlapping data use terms correspond to same data identification information, and when the eighth means decides that overlapping data use terms correspond to same apparatus identification information denoting the present apparatus.

5. A data using apparatus as recited in claim 1, further comprising eighth means for disabling attribute information related to the first data use history information and the second data use history information in response to the multiple apparatus use notice information generated by the seventh means.

6. A data using apparatus as recited in claim 1, further comprising:
an information recording device for recording first attribute information peculiar to the present apparatus;
eighth means for receiving second attribute information from the external apparatus;
ninth means for deciding whether or not the first attribute information recorded by the information recording device and the second attribute information received by the eighth means are identical with each other;
tenth means for transmitting the second data use history information from the third means to the fifth means when the ninth means decides that the first attribute information and the second attribute information are identical with each other; and
eleventh means for inhibiting transmission of the second data use history information from the third means to the fifth means when the ninth means decides that the first attribute information and the second attribute information are not identical with each other.

7. A data using apparatus as recited in claim 3, further comprising ninth means for disabling attribute information related to data corresponding to the overlapping data use terms and the same data identification information in response to the multiple data use notice information generated by the eighth means.

8. A data using apparatus as recited in claim 1, wherein data recorded by the data recording device has added information representing a number of data using apparatuses permitted to be employed, and the seventh means comprises means for calculating a number of overlapping data use terms among the first data use terms and the second data use terms, means for deciding whether or not the calculated number is greater than a number of data using apparatuses permitted to be employed which is represented by added information related to data corresponding to the overlapping data use terms, and means for generating multiple apparatus use notice information when it is decided that the calculated number is greater than the number of data using apparatuses permitted to be employed.

9. In a system including a plurality of data using apparatuses having attribute information pieces respectively, the data using apparatuses holding data use histories respectively, wherein each of the data use histories is updated for every data use event by adding thereto a record relating a data use time information piece about use of a data piece by the present data using apparatus, a data identification information piece for identifying said data piece, and an apparatus identification information piece for identifying the present data using apparatus with each other, a data use history analyzing method implemented by each of the data using apparatuses which comprises the steps of:
 a) comparing the attribute information piece of the present data using apparatus and one or more attribute information pieces of one or more data using apparatuses different from the present data using apparatus to detect at least one data using apparatus having an attribute information piece identical with the attribute information piece of the present data using apparatus, and to detect, among records in data use histories of one or more data using apparatuses different from the present data using apparatus, those records relating to the detected at least one data using apparatus;
 b) deciding whether or not all records among records in the data use history of the present data using apparatus and the records detected by the step a) include records in which terms represented by data use time information pieces at least partially overlap each other, and data identification information pieces are identical with each other and apparatus identification information pieces are different from each other; and
 c) detecting overlap use of a data piece identified by the identical data identification information pieces when the step b) decides that all records include records in which terms represented by data use time information pieces at least partially overlap each other, and data identification information pieces are identical with each other and apparatus identification information pieces are different from each other.

10. In a system including a plurality of data using apparatuses having attribute information pieces respectively, the data using apparatuses holding data use histories respectively, wherein each of the data use histories is updated for every data use event by adding thereto a record relating a data use time information piece about use of a data piece by the present data using apparatus and an apparatus identification information piece for identifying the present data using apparatus with each other, a data use history analyzing method implemented by each of the data using apparatuses which comprises the steps of:
 a) comparing the attribute information piece of the present data using apparatus and one or more attribute information pieces of one or more data using apparatuses different from the present data using apparatus to detect at least one data using apparatus having an attribute information piece identical with the attribute information piece of the present data using apparatus, and to detect, among records in data use histories of one or more data using apparatuses different from the present data using apparatus, those records relating to the detected at least one data using apparatus;
 b) deciding whether or not all records among records in the data use history of the present data using apparatus and the records detected by the step a) include records in which terms represented by data use time information pieces at least partially overlap each other, and apparatus identification information pieces are different from each other;
 c) detecting overlap use of a data piece when the step b) decides that all records include records in which terms represented by data use time information pieces at least partially overlap each other, and apparatus identification information pieces are different from each other; and
 d) issuing multiple apparatus use notice information when the step c) detects the overlap use of the data piece.

11. In a system including a plurality of data using apparatuses having attribute information pieces respectively, the data using apparatuses holding data use histories respectively, wherein each of the data use histories is updated for every data use event by adding thereto a record relating a data use time information piece about use of a data piece by the present data using apparatus and an apparatus identification information piece for identifying the present data using apparatus with each other, a data use limitation controlling method implemented by each of the data using apparatuses which comprises the steps of:
 a) comparing the attribute information piece of the present data using apparatus and one or more attribute information pieces of one or more data using apparatuses different from the present data using apparatus to detect at least one data using apparatus having an attribute information piece identical with the attribute information piece of the present data using apparatus, and to detect, among records in data use histories of one or more data using apparatuses different from the present data using apparatus, those records relating to the detected at least one data using apparatus;
 b) deciding whether or not all records among records in the data use history of the present data using apparatus and the records detected by the step a) include records in which terms represented by data use time information pieces at least partially overlap each other, and apparatus identification information pieces are different from each other;
 c) detecting overlap use of a data piece when the step b) decides that all records include records in which terms represented by data use time information pieces at least partially overlap each other, and apparatus identification information pieces are different from each other; and
 d) limiting use of the data piece when the step c) detects the overlap use of the data piece.

12. In a system including a plurality of data using apparatuses having attribute information pieces respectively, the data using apparatuses holding data use histories respectively, wherein each of the data use histories is updated for every data use event by adding thereto a record relating a data use time information piece about use of a data piece by the present data using apparatus, an apparatus identification information piece for identifying the present data using apparatus, and a simultaneous data use limiting information piece representative of a maximum number of data using apparatuses permitted to use the data piece with each other, a data use limitation controlling method implemented by each of the data using apparatuses which comprises the steps of:
- a) comparing the attribute information piece of the present data using apparatus and one or more attribute information pieces of one or more data using apparatuses different from the present data using apparatus to detect at least one data using apparatus having an attribute information piece identical with the attribute information piece of the present data using apparatus, and to detect, among records in data use histories of one or more data using apparatuses different from the present data using apparatus, those records relating to the detected at least one data using apparatus;
- b) deciding whether or not all records among records in the data use history of the present data using apparatus and the records detected by the step a) include records in which terms represented by data use time information pieces at least partially overlap each other, and apparatus identification information pieces are different from each other;
- c) when the step b) decides that all records include records in which terms represented by data use time information pieces at least partially overlap each other and apparatus identification information pieces are different from each other, comparing a number of the included records with maximum numbers represented by simultaneous data use limiting information pieces in the included records to detect at least one simultaneous data use limiting information piece representative of a maximum number less than the number of the included records;
- d) detecting overlap use of a data piece when the step c) detects at least one simultaneous data use limiting information piece representative of a maximum number less than the number of the included records; and
- e) limiting use of the data piece when the step d) detects the overlap use of the data piece.

13. In a system including a plurality of data using apparatuses having attribute information pieces respectively, the data using apparatuses holding data use histories respectively, wherein each of the data use histories is updated for every data use event by adding thereto a record relating a data use time information piece about use of a data piece by the present data using apparatus and an apparatus identification information piece for identifying the present data using apparatus with each other, a data use limitation controlling method implemented by each of the data using apparatuses which comprises the steps of:
- a) comparing the attribute information piece of the present data using apparatus and one or more attribute information pieces of one or more data using apparatuses different from the present data using apparatus to detect at least one data using apparatus having an attribute information piece identical with the attribute information piece of the present data using apparatus, and to detect, among records in data use histories of one or more data using apparatuses different from the present data using apparatus, those records relating to the detected at least one data using apparatus;
- b) deciding whether or not all records among records in the data use history of the present data using apparatus and the records detected by the step a) include records in which terms represented by data use time information pieces at least partially overlap each other, and apparatus identification information pieces are different from each other;
- c) detecting overlap use of a data piece when the step b) decides that all records include records in which terms represented by data use time information pieces at least partially overlap each other, and apparatus identification information pieces are different from each other;
- d) issuing multiple apparatus use notice information to at least one data using apparatus differing from the present data using apparatus and relating to the overlap use of the data piece when the step c) detects the overlap use of the data piece;
- e) receiving multiple apparatus use notice information from a data using apparatus different from the present data using apparatus; and
- f) limiting use of a data piece in response to the received multiple apparatus use notice information.

14. In a system including first and second data using apparatuses, the first data using apparatus having a first attribute information piece and holding a first data use history, the second data using apparatus having a second attribute information piece and holding a second data use history, wherein the second data use history is updated for every data use event by adding thereto a record relating a data use time information piece about use of a data piece by the second data using apparatus and an apparatus identification information piece for identifying the second data using apparatus with each other, a data use limitation controlling method implemented by the first data using apparatus which comprises the steps of:
- a) updating the first data use history for every data use event by adding thereto a record relating a data use time information piece about use of a data piece by the first data using apparatus and an apparatus identification information piece for identifying the first data using apparatus with each other;
- b) obtaining the second data use history from the second data using apparatus;
- c) obtaining the second attribute information piece from the second data using apparatus;
- d) comparing the first attribute information piece and the obtained second attribute information piece to decide whether or not the first attribute information piece and the obtained second attribute information piece are identical with each other;
- e) when the step d) decide that the first attribute information piece and the obtained second attribute information piece are identical with each other, deciding whether or not all records in the first data use history and the obtained second data use history include records in which terms represented by data use time information pieces at least partially overlap each other, and apparatus identification information pieces are different from each other;
- f) detecting overlap use of a data piece when the step e) decides that all records include records in which terms represented by data use time information pieces at least partially overlap each other, and apparatus identification information pieces are different from each other; and
- g) limiting use of the data piece when the step f) detects the overlap use of the data piece.

15. In a system including first and second data using apparatuses, the first data using apparatus having a first attribute information piece and holding a first data use history, the second data using apparatus having a second attribute information piece and holding a second data use history, wherein the second data use history is updated for every data use event by adding thereto a record relating a data use time information piece about use of a data piece by the second data using apparatus, an apparatus identification information piece for identifying the second data using apparatus, and a simultaneous data use limiting information piece representative of a maximum number of data using apparatuses permitted to use the data piece with each other, a data use limitation controlling method implemented by the first data using apparatus which comprises the steps of:

- a) updating the first data use history for every data use event by adding thereto a record relating a data use time information piece about use of a data piece by the first data using apparatus and an apparatus identification information piece for identifying the first data using apparatus with each other;
- b) obtaining the second data use history from the second data using apparatus;
- c) obtaining the second attribute information piece from the second data using apparatus;
- d) comparing the first attribute information piece and the obtained second attribute information piece to decide whether or not the first attribute information piece and the obtained second attribute information piece are identical with each other;
- e) when the step d) decides that the first attribute information piece and the obtained second attribute information piece are identical with each other, deciding whether or not all records in the first data use history and the obtained second data use history include records in which terms represented by data use time information pieces at least partially overlap each other, and apparatus identification information pieces are different from each other;
- f) when the step e) decides that all records include records in which terms represented by data use time information pieces at least partially overlap each other and apparatus identification information pieces are different from each other, comparing a number of the included records with maximum numbers represented by the data use limiting information pieces in the included records to detect at least one simultaneous data use limiting information piece representative of a maximum number less than the number of the included records;
- g) detecting overlap use of a data piece when the step f) detects at least one simultaneous data use limiting information piece representative of a maximum number less than the number of the included records; and
- h) limiting use of the data piece when the step g) detects the overlap use of the data piece.

* * * * *